US005308680A

United States Patent [19]

Desjarlais et al.

[11] Patent Number: 5,308,680

[45] Date of Patent: May 3, 1994

[54] ACCEPTOR SHEET USEFUL FOR MASS TRANSFER IMAGING

[75] Inventors: Robert C. Desjarlais, So. Hadley; Robert C. Zawada, West Springfield, both of Mass.

[73] Assignee: Rexham Graphics Inc., South Hadley, Mass.

[21] Appl. No.: 780,234

[22] Filed: Oct. 22, 1991

[51] Int. Cl.[5] ................................................ B32B 3/00

[52] U.S. Cl. .................................... 428/195; 428/206; 428/208; 428/402; 428/411.1; 428/446; 428/480

[58] Field of Search ............... 428/195, 206, 208, 212, 428/402, 411.1, 480, 446; 503/227

[56] References Cited

U.S. PATENT DOCUMENTS 4,876,235 10/1989 DeBoer ............................... 503/227

*Primary Examiner*—Patrick J. Ryan
*Assistant Examiner*—Elizabeth Evans
*Attorney, Agent, or Firm*—Burns, Doane, Swecker & Mathis

[57] ABSTRACT

Provided is an acceptor sheet useful for receiving marking material in imagewise fashion by means of mass transfer printing. The acceptor sheet comprises a substrate which has a microrough surface, wherein the coating is comprised of polymer particles which have not coalesced to form a uniform, continuous film. Such acceptor sheets exhibit superior mass transfer printing properties, and in particular superior wax thermal transfer printing properties, as compared to acceptor sheets having smooth coatings comprised of film-forming polymers.

19 Claims, 2 Drawing Sheets

ACCEPTOR SHEET USEFUL FOR MASS TRANSFER IMAGING

BACKGROUND OF THE INVENTION

The present invention relates to a transparent coating on a film support. Such coated supports of the invention are useful as transfer imaging receiver sheets for many different types of transfer imaging techniques, e.g., phase change ink jet printing, laser printing, applications in color copiers, wax thermal transfer printing, and others. The present invention, in a preferred embodiment, relates to an acceptor sheet for wax thermal transfer printing having improved wax receptivity for wider printing latitude, and a reduced tendency to jam the printing mechanism.

Thermal transfer printing employs a donor sheet-acceptor sheet system, whereby a thermal printhead applies heat to the backside of a donor sheet in selective imagewise fashion. The images are transferred to the acceptor sheet either by chemical reaction with, or mass transfer from, the donor sheet. Mass transfer systems provide for the transfer of colored material directly from the donor to the acceptor sheet, with no color-forming chemical reaction occurring.

In wax thermal (mass) transfer printing, an ink or other record-forming material in admixture with a wax compound is transferred from a donor such as a carrier ribbon to an acceptor sheet by applying heat to localized areas of the carrier. The wax/ink mixture on the carrier ribbon melts or softens, preferentially adhering to the acceptor sheet, which may be either paper or transparent film. In the case of paper, the acceptor sheet has more surface roughness than does the carrier, so ink transfer is largely achieved by a physical interlocking of the softened wax and ink with the paper fibers.

The transfer of a marking material to an acceptor sheet film such as transparent polyester, differs in that the surface of the film is very smooth. Here, wetting of the film surface by the softened wax/ink mixture must be adequate in order to provide preferential adhesion of the wax/ink mixture to the acceptor rather than to the donor sheet. The transfer of single pixel dots is particularly sensitive to differences in adhesion because some of the heat input at the individual dot is dissipated into the surrounding ink mass, decreasing the temperature of the dot and lessening its ability to transfer.

One solution to this problem has been to incorporate wax in a coating layer placed over an acceptor sheet film substrate. U.S. Pat. No. 4,686,549 relates to a receptor (i.e., acceptor) sheet having a wax-compatible image receptive layer which can be inter alia an ethylene/vinyl acetate copolymer blended with a paraffin wax, a microcrystalline wax or a mixture of both. The image receptive layer has a critical surface tension higher than that of the donor sheet, which aids in wetting of the image receptive layer. Furthermore, this patent teaches that the Vicat softening temperature (as measured by ASTM D1525 (1982)) of the polymers forming the image receptive layer should be at least 30° C. up to 90° C. to prevent tackiness of the acceptor sheet at room temperature. At softening temperatures below 30° C., according to this patent, problems arise such as finger-printing and blocking of stacked film.

Polymeric coatings with a 30° C. to 90° C. softening point generally do have the advantage of minimal handling problems, as suggested by the above patent. The disadvantage is that such coatings are suitable for use only with selected combinations of printers and donor sheets. If, for example, the melting point of the wax on the donor sheet is above a specified maximum for a given printer, an insufficient amount of wax may be transferred to the acceptor sheet. Likewise, if the particular printer does not provide sufficient heat energy, the heat transfer from the donor sheet to the acceptor sheet, via the wax, may not increase the tackiness of the image receptive layer sufficiently for adhering the wax to the acceptor sheet, even if the wax does melt sufficiently for transfer. The result is inter alia poor fine line reproduction.

A number of polymeric coatings placed on the acceptor sheet have been claimed to improve ink transfer, including polyester, polycarbonate, polyamide, urea, and polyacrylonitrile resins, saturated polyester resins, stearamide, and poly(alkylvinylethers), poly(meth)acrylic esters, polymethylvinylketone, polyvinylacetate, and polyvinylbutyral. In general, these polymeric coatings have a somewhat higher degree of adhesiveness than the transparent film substrate. This accounts for an increased receptivity of the coating as compared to the substrate. Heat transfer from the printing head to the coating increases adhesiveness even further.

Examples of this type of coating are disclosed in U.S. Pat. No. 4,678,687 which relates to thermal transfer printing sheets useful as transparencies wherein a polymeric coating is applied to a receptor substrate. The coating can be a poly(vinylether), poly(acrylic acid ester), poly(methacrylic acid ester), poly(vinylmethylketone), poly(vinylacetate) or poly(vinylbutyral). The coating allegedly provides increased resolution as compared to an uncoated substrate by increasing the adhesion of the transferred ink or dye to the receptor printing sheet. The coating composition is approximately 100% of the recited polymers.

A problem arises with these compositions when the tackiness of the coating is high enough to cause feeding problems and jamming of the printer due to adhesion either between acceptor sheets, or between the acceptor sheets and the printer rollers. High tackiness can also result in excessive wax transfer from the donor which, in the case of transfer of single pixels, results in unacceptable half tone images due to bridging of individual half tone dots. Excess tackiness also results in finger-printing and blocking.

Problems also can arise due to electrical charge build-up on the sheets. This build-up can occur during converting, jogging of film stacks and during film transport in the printer during the printing process. Such build up can cause misfeeds, printer jams, and multiple sheet feeding due to static cling.

An accepter sheet, particularly one applicable for wax thermal transfer printing, which can avoid the foregoing problems often encountered with the use of polymerics in acceptor/receptor sheets would be of great value to the industry.

Accordingly, it is an object of the present invention to provide an acceptor sheet for wax thermal transfer printing having improved wax receptivity.

It is still another object of the present invention to provide an acceptor sheet for wax thermal transfer printing which is particularly adapted to faithful reproduction of pixel dot image formation.

It is another object of the present invention to provide an acceptor sheet for wax thermal transfer printing which provides wider printing latitude.

It is still another object of the present invention to provide an acceptor sheet for thermal imaging which has a reduced tendency to jam the printing mechanism.

It is another object of the present invention to provide a novel acceptor sheet for mass transfer imaging.

It is yet another object of the invention to provide an acceptor sheet, as above, which maintains the above characteristics yet which can be used with a wide variety of printers.

These and other objects of the present invention will become apparent upon a review of the following specification and the claims appended thereto.

SUMMARY OF THE INVENTION

The foregoing objectives are achieved by an acceptor sheet for receiving marking material in imagewise fashion wherein the acceptor sheet is comprised of a substrate and a coating thereon which provides the acceptor sheet with a microrough surface. The coating is comprised of non-film forming polymer particles, i.e., wherein the particles have not coalesced to form a uniform, continuous film. In a most preferred embodiment, the acceptor sheet of the present invention also contains colloidal silica. It is also preferred that the polymer particles be coated from an aqueous dispersion.

The polymer in the acceptor sheet coating layer is "non-film forming" in the sense that a uniform continuous polymer film does not exist in the coating layer. The film-forming temperature of the polymer is accordingly sufficiently high to permit drying, storage and manipulation of the acceptor sheet without causing the polymer particles to coalesce and form a uniform, continuous film on a microscopic scale.

Such acceptor sheets have been found to exhibit superior mass transfer printing properties, and in particular superior wax thermal transfer printing properties, compared to polymer film coatings wherein the polymer particles have coalesced to form a uniform, continuous film. The superior printing is believed to be accomplished by means of mechanical intermingling between the microrough surface of the acceptor sheet of the present invention with the soft transferred wax image from the donor sheet. The microrough surface is achieved due to the non-film forming nature of the polymer used. The lack of a uniform, continuous film results in the microrough surface. The presence of colloidal silica is preferred since its presence can enhance the microrough surface characteristics of the acceptor sheet, the print quality achieved, and also provides resistance to electrical charge build up during the converting, jogging of film stacks, and during film transport in the printer, thereby overcoming the problems of charge build up.

DETAILED DESCRIPTION OF THE PREFERRED EMBODIMENTS

Figure 1:
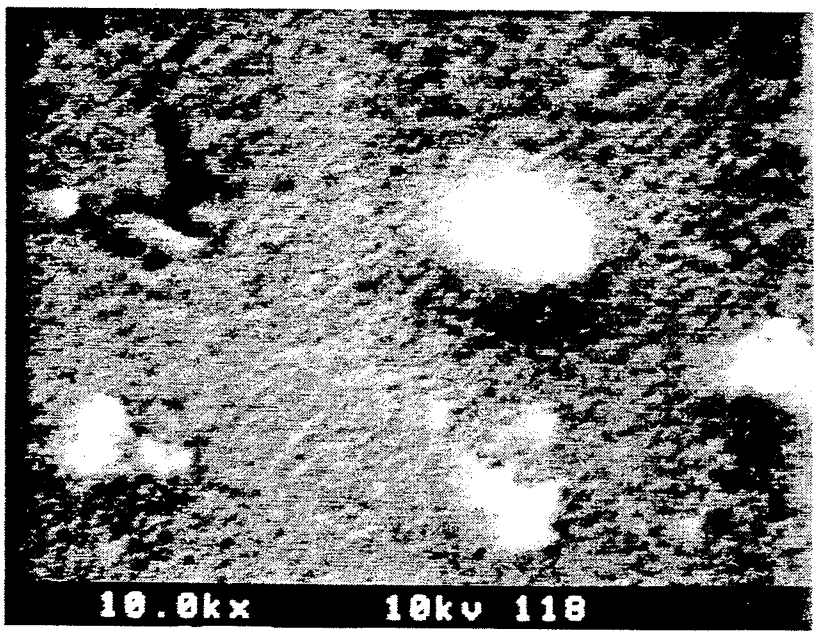
FIG. 1 is a photomicrograph of an acceptor sheet of the present invention containing colloidal silica, made in accordance with Example ? .

The acceptor sheet of the present invention is most suitably applicable as an acceptor sheet in wax thermal transfer printing. The acceptor sheet is comprised of a substrate coated with a very thin, transparent coating having a microrough surface. It is this microrough surface which permits superior printing to be accomplished. Due to the microrough surface, mechanical intermingling with the soft transferred wax image can occur, thereby permitting excellent transfer of the wax pixel in a wax thermal transfer printing operation. The intermingling also results in excellent archival stability such as rougher handling of the acceptor sheets without fear of losing the transferred images is realized. The microrough surface of the present invention provides physical interlocking somewhat like the paper used in thermal wax transfer printers, and thereby substantially differs from the smooth polymer coatings employed in much of the prior art.

The coating of the acceptor sheet of the present invention might also be described as microporous. Micropores exist due to the non-coalescence of the polymer particles. Since the polymer particles do not coalesce to form a continuous film, there exists some spacing between the non-film forming polymer particles. These spaces are the micropores, and can exist throughout the coating structure. It is believed that the marking material, particularly melted wax, enters the pores and provides the desired mechanical intermingling. It is the existence of these spacings at the surface of the coating which renders the coating surface non-continuous and hence microrough.

The microroughness of the acceptor sheet surface is generally sufficient to overcome the adhesion of the wax (or other marking material) to a donor sheet used in a mass transfer imaging system. This microrough surface can be achieved by coating a non-film forming polymer on a suitable substrate, preferably in mixture with colloidal silica. Use of a mixture of polymer and colloidal silica results in a more universally applicable acceptor sheet with quite excellent printing properties.

The weight ratio of polymer to colloidal silica used in the coating can generally range from about 100% polymer to about 20:80 weight % polymer to colloidal silica. It is preferred that the amount of polymer in the coating ranges from about 80 to 40 weight %, and most preferably from about 55 to 65 weight %.

The polymer or polymer/colloidal silica mixture is generally coated onto a substrate in an aqueous dispersion. The use of an aqueous dispersion is most preferred due to environmental and economical considerations. If necessary, however, an organic medium might be used. Small amounts of an organic medium might be used to aid coatability, e.g., by reducing surface tension. It is important, however, that when an organic medium is used it does not act as a coalescing agent for the polymer.

The dispersion of polymer is coated onto a suitable substrate and dried using conventional techniques. For example, a Mayer rod or gravure technique can be used for applying the coating dispersion to a substrate, and the coating can be dried in an oven or by simply air drying if convenient. The drying of the coated polymer dispersion removes the dispersing medium, e.g., water, but must not result in the polymer particles coalescing to form a uniform continuous film, otherwise the microrough surface of the present invention may not be achieved. Thus, the minimum film forming temperature NALCO COLLOIDAL SILICAS
General Product Information
(Typical Values Only)

| | Product: | | | | | | | | | | |
|---|---|---|---|---|---|---|---|---|---|---|---|
| | Nalco ® 1115 | Nalco ® 2326 | Nalco ® 1130 | Nalco ® 1030 | Nalco ® 1140 | Nalco ® 1034A | Nalco ® 1040 | Nalco ® 2327 | Nalco ® 1050 | Nalco ® 1060 | Nalco ® 2329 |
| Particle Size (nm) | 4 | 5 | 8 | 13 | 15 | 20 | 20 | 20 | 20 | 60 | 75 |
| Surface Area (M2/gm) | 750 | 600 | 375 | 230 | 200 | 150 | 150 | 150 | 150 | 50 | 40 |
| % Silica (as SiO2) | 15 | 15 | 30 | 30 | 40 | 34 | 40 | 40 | 50 | 50 | 40 |
| pH (@ 25° C.) | 10.5 | 9.0 | 10.0 | 10.2 | 9.7 | 2.8 | 9.0 | 9.3 | 9.0 | 8.5 | 8.4 |
| Specific Gravity | 1.10 | 1.09 | 1.21 | 1.20 | 1.29 | 1.23 | 1.29 | 1.29 | 1.39 | 1.39 | 1.29 |
| Viscosity (Centipoise) | <10 | <10 | <10 | <10 | 15 | <10 | 15 | 20 | 55 | 15 | 10 |
| Stabilizing Ion | Sodium | Ammonium | Sodium | Sodium | Sodium | — | Sodium | Ammonium | Sodium | Sodium | Sodium |
| Approx. $Na_2O$, % | 0.75 | 0.02 | 0.45 | 0.50 | 0.45 | 0.04 | 0.45 | 0.08 | 0.40 | 0.35 | 0.30 |
| Surface Charge | Negative | Negative | Negative | Negative | Negative | Slightly Negative | Negative | Negative | Negative | Negative | Negative |

of the polymer used must be above the drying temperature employed. Air drying, of course, can be used when the minimum film forming temperature is a consideration.

It is also preferred that the polymer's Vicat softening point or $T_g$ is about 70° C. or greater, and preferably about 100° C. or greater. This permits much easier handling, greater resistance to blocking during manufacture or storage, and avoids printer jams.

Examples of polymers useful in the present invention are the rheology controlled non-film forming aqueous dispersed styrenated acrylics available from S.C. Johnson under the trademark Joncryl. Any polymer, however, which meets the aforedescribed non-film forming requirements can be employed. As long as the polymer has a minimum film forming temperature which is higher than that of the drying temperature to be employed in the process, the polymer should be suitable. It is also preferred that the polymer has a softening temperature sufficiently high to avoid softening and smoothing of the surface of the acceptor sheet during heat of contact in the thermal transfer processing.

The colloidal silicas appropriate for the practice of the present invention can be any appropriate colloidal silica. Those preferred are colloidal silicas presently available from E.I. DuPont de Nemours and from Nalco Corporation. These colloidal silicas range in size from about 4 to 75 nanometers, are negatively charged and treated with cationic sodium or ammonium counterions. The surface areas of the colloidal silicas range from 40 to about 750 $m^2$/Gm. As a general consideration, it is preferred for performance sake that the size of the colloidal silica is less than the size of the polymer particles, e.g., about 65 to 77 nm. Colloidal silica having a size of about 5 to 10 nm, and most preferably about 5 nm, is therefore most preferred as being more universally applicable. The following Table lists several suitable colloidal silicas available from Nalco Corporation and their physical/chemical characteristics.

The colloidal silica is used in mixture with the non-film forming polymer. A combination of the polymer and silica provides a more universal product applicable with regard to many different printers. The presence of the colloidal silica together with the polymer also overcomes problems with electric charge build up.

Besides the non-film forming polymer and/or colloidal silica, the coating of the acceptor sheet can contain conventional fillers and additives. A volatile defoamer and wetting agent, e.g., ethanol, can be added to the coating mix if desired for foam control and improved wetability of the film substrate. As well, amorphous silicas, generally of a larger particle size than colloidal silica, may be added to the coating formulation to prevent excessive clinging of the sheets or coating offset of the film during storage, e.g., blocking of master rolls. Other particulate additives may also be added if desired.

In some cases, particularly when the ultimate use is as an overhead transparency, it is also important that the acceptor sheet coating be transparent. One of the advantages of the present invention is that a transparent coating is possible in combination with a surface permitting interlocking/intermingling with the marking material. Generally, the Gardner Haze value is unacceptably high when a surface is not smooth.

A transparent coating generally has a Gardner Haze value of from about 2 to about 15%, with from about 2 to about 10% being preferred, and with about 2 to about 5% being most preferred. The transparent coating generally is very thin, and is preferably from about 0.005 to 0.05 mils, and most preferably from about 0.01 to about 0.03 mils in thickness. The amount of coating material generally comprises less than 0.2 lbs. per 1000 square feet of acceptor sheet. It is preferred that the amount of coating material applied be from about 0.01 to about 0.1 lbs. per 1000 square feet, with about 0.03 to 0.05 lbs. per 1000 square feet being most preferred. Once the coating is heavy and thick enough to approach 0.25 lbs. per about 1000 square feet or more, transparency begins to be lost, i.e., the Gardner Haze value becomes unacceptable. It has also been found that such heavy coatings can surprisingly lack adhesion to the film substrate and lack cohesive strength, i.e., the coating begins to fall off in flakes.

The substrate for the acceptor sheet upon which the coating is coated is a film comprising a polymer such as polypropylene, polycarbonate, polysulfone, polyvinylchloride, cellulose acetate, cellulose acetate butyrate, or a polyester. Paper or paper-like materials, however, can also be used as a substrate. In fact, the coating of the present invention can be suitably used to provide a desirable microrough surface to a substrate which has surface topography too rough for a particular purpose.

In a preferred embodiment the substrate of the acceptor sheet is a smooth film. Examples of such substrates are MYLAR, commercially available from E.I. DuPont de Nemours; MELINEX, commercially available from Imperial Chemical Industries; HOSTAPHAN, commercially available from American Hoechst; polycarbonates, especially LEXAN; cellulose triacetates and the like. In general, the selection of the substrate composition is dictated by the particular and ultimate use of the acceptor sheet. In addition to transparent substrates, there can be used opaque or colored substrates in which one or more pigments or dyes are included in the substrate composition. One skilled in the art can readily select the appropriate substrate composition for use in the present invention.

The most preferred substrate for overhead transparencies is a transparent polyethylene terephthalate film, with a thickness range of from about 50 to about 175 microns being highly preferred.

A backing sheet may be applied to one side of the substrate as an aid in the printing process. This is advantageous when the acceptor sheet is used in conjunction with certain thermal transfer printers having a complicated paper feed path which places limitations on the stiffness of the substrate. The preferred substrate thickness with respect to meeting the limitations on thickness is about 50 microns. However, the print heads of certain printers are also sensitive to substrate thickness, and for printing purposes the optimum thickness is about 125 microns. This caliper would, however, be too stiff for feeding. To circumvent this problem, in a preferred embodiment the present invention provides for a backing sheet attached to the substrate. The backing sheet can be paper, synthetic paper such as filled by axially oriented polypropylene, polyester film or coated polyester. Synthetic paper is preferred because of its greater dimensional stability on exposure to changes in temperature and humidity. Also, a higher coefficient of friction between the back of the acceptor sheet and the synthetic backing sheet is achieved which prevents slippage between the two films during the printing process. Slippage can result in misregistration of colors, misfeeding or jamming in the printer.

In a highly preferred embodiment employing a backing sheet, a polyester substrate is used having a thickness of 50 microns with a 75 to 80 micron synthetic paper backing sheet. The backing sheet can be attached via an adhesive. This embodiment of the invention can be used for preparation of transparency films for overhead projection using a Tektronix 4693D or 4694 thermal transfer printer, but use is not limited to these printers.

While the acceptor sheet of the present invention finds unique applicability to wax thermal transfer printing, many other useful applications are possible for this unique acceptor sheet. The sheet can be used in many types of mass transfer imaging techniques, e.g., for toner receptive techniques such as laser printers, color copiers, various monochrome xerographic copiers, etc., and phase change ink jet printing. Particular advantageous applicability has been found for the acceptor sheet with imaging techniques involving the transfer of a wax mass or a toner mass.

The following examples illustrate the invention. It is understood, however, that these examples are not to be interpreted as limiting the scope of the invention.

EXAMPLE 1

A mix of the following components was prepared:

| | |
|---|---|
| 48.5% Joncryl 87 (in water) | 5.15 Gms. |
| WATER | 19.85 Gms. |
| SAN SIL KU-33 (anti-blocking agent) | 0.055 Gms. |

The mix was coated onto Hoechst-Celanese 2.0 mil. thick AH4507 prebonded polyester base with a #4 wire wound Mayer rod. The "wet" film was then placed in a laboratory "Blue M" convection oven for 1½ minutes at 170° F. (77° C.) to obtain a dry coating weight of approximately 0.05 lbs./1000 sq. ft. The dried film was cut to 8½×14 inches in size and attached on the back to 3.2 mil. thick Kimdura 80 opaque synthetic paper backing sheet. Attachment was with a ½ inch wide tape placed 1 inch from the leading edge of the short axis of the 8½×14 inch backing sheet. A photomicrograph of the sheet surface at 10,000× magnification is shown in FIG. 1.

Figure 2:
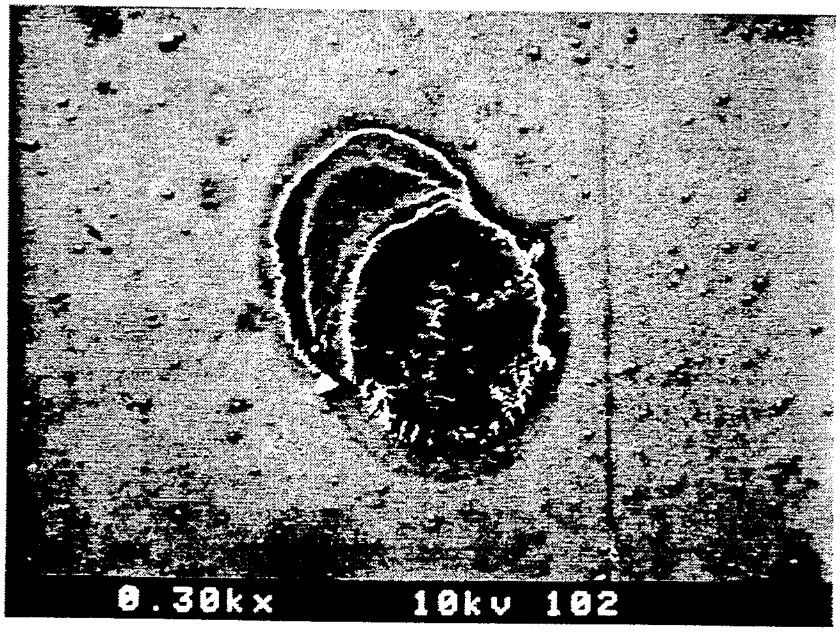
FIG. 2 is a photomicrograph of an acceptor sheet of the present invention at 300× magnification which shows a wax pixel.

The film was then printed in a Tektronix 4694 Phaser II wax thermal transfer printer equipped with a three pass color ribbon (cyan, magenta, yellow-Tektronix Part No. 016-0906-01). A photomicrograph of the printed sheet surface, showing a wax pixel, at 300× magnification is shown in FIG. 2.

The printing pattern was accomplished according to self test print instructions in a Tektronix field service manual (Part No. 070-8199-00, Section 5-1). The printing patterns used were:

1) RAG PATCH—FAST SPEED
2) DITHER—FAST SPEED
3) ALIGNMENT CROSSLINE—FAST SPEED

From the RAG PATCH printing pattern one can evaluate pantone colors, alignment and fine pixel printing. The DITHER pattern allows one to evaluate tonal quality, bridging, grey scale and pixel drop off. Proper alignment (measured in mm.) of colors and fine wire modelling can be evaluated using the ALIGNMENT CROSSLINE pattern.

Superior printing was obtained as compared to the printing achieved when the comparative formulation described below was used as the coating for the acceptor sheet:

| | | |
|---|---|---|
| WATER | 24.32 Gm. | |
| ETHANOL | 36.47 Gm. | |
| 25% Eastman AQ38D | 37.32 Gm. | soft film former |
| BASF 70% Polymethyl vinyl ether in toluene | 1.67 Gm. | tacky film former |
| San-Sil KU-33 (amorphous silica) | 0.22 Gm. | |

Similar superior results as noted above were obtained when Joncryl 87 was replaced with Joncryl 89 and Joncryl 134 in the inventive formulations of this example. Joncryl 87, Joncryl 89 and Joncryl 134 are all non-film forming dispersed styrenated acrylic polymers available from S.C. Johnson, Racine, Wis.

San-Sil KU-33 is an amorphous silica sold by PPG Industries, Pittsburgh, Pa.—about 2.5 microns in size.

Eastman AQ38D is a film forming anionic dispersed polyester resin supplied by Eastman Chemicals.

70% polymethyl vinyl ether is sold by BASF chemicals.

Kimdura 80 paper is sold by Kimberly Clark.

EXAMPLE 2

A comparison of various aqueous dispersed and solution polymers was made. The polymers listed in the following Table were coated and then printed as in Example 1. Rag patch rating, saturation dither, and "HOT PRINT" were rated for three coatings of each variation.

With respect to "HOT PRINT," in some printers, especially, e.g., the Tektronix 4694 printer, the printing of multiple copies of highly colored areas using all three primary colors, raises the internal temperature of the printer. If the cooling air across the thermal head is not sufficient to cool the printing head below a certain temperature, a thermistor will reduce the voltage across the print head in order to protect the print head from burning out. The reduced voltage causes poor transfer from the donor ribbon to the film substrate, especially if the receptor sheet is too smooth. High temperatures outside the printer aggravate this condition more quickly. In any event, the result is a very poor density print, from poor or no transfer of the wax to the transparent receptor sheet. This can be a serious problem.

In order to simulate a high internal printer temperature, the following "HOT PRINT" procedures were established:

A box was placed over the 4694 printer (the shipping box for the printer) and a circular 4" diameter hole was cut on the side of the box. A hair dryer was inserted into the hole to heat the air around the outside of the printer, and subsequently the internal temperature of the printer to about 102° F. (38° C.). As can be seen from the results set forth in the following Table, presentation print programs were run and smooth polymer coatings began to fail to pick up the poorly softened wax while the microrough surfaces tenaciously held onto the wax dot, as demonstrated by the saturation dither rating.

TABLE

| POLYMER | TYPE | RAG PATCH RATING | SATURATION DITHER* | HOT PRINT | |
|---|---|---|---|---|---|
| Joncryl | 134 | g | 16 | Good | S. C. Johnson |
| Joncryl | 87 | g | 16 | Fair | |
| Joncryl | 89 | g | 16 | Good | Polyvinyl Chemicals, |
| Neorez | R-967 | g | 16 | Poor | Wilmington, MA. |
| Joncryl | 530 | g | 15.8 | Poor | Rohm & Haas |
| Joncryl | 538 | g | 15.8 | Poor | |
| Jonwax | 26 | f | 15.6 | Good | |
| Joncryl | 138 | g | 15.4 | Poor | |
| Rhoplex | HA-12 | g | 15.4 | Poor | |
| Joncryl | 95 | g | 15 | — | |
| Jonwax | 22 | g | 15 | — | |
| Joncryl | 99 | g | 14.8 | — | |
| Polysize | 5008 | g | 14.8 | — | |
| Joncryl | 1679 | g | 14 | — | |
| Joncryl | 1536 | f | — | — | Morton Chemicals |
| Polycryl | 7F7 | f | — | — | |
| Joncryl | 61LV | f | — | — | |
| Joncryl | 554 | f | — | — | |
| Joncryl | 91 | f | — | — | |
| Joncryl | 52 | f | — | — | |
| Joncryl | 130 | f | — | — | |
| Joncryl | 537 | f | — | — | |
| Polyfilm | 350 | f | — | — | |
| Joncryl | 620 | f | — | — | |
| Polyfilm | 342 | f | — | — | |
| Joncryl | 58 | f | — | — | |
| Polyfilm | 301 | f | — | — | |
| Joncryl | 56 | f | — | — | |
| Joncryl | 142 | ng | — | — | |
| Joncryl | 1535 | ng | — | — | |
| Joncryl | 540 | ng | — | — | |
| Joncryl | 80 | ng | — | — | |
| Joncryl | 624 | ng | — | — | |
| Joncryl | 62 | ng | — | — | |
| Joncryl | 85 | ng | — | — | |
| Joncryl | 77 | ng | — | — | |
| Joncryl | 585 | ng | — | — | |
| Joncryl | 617 | ng | — | — | |
| Jonwax | 120 | ng | — | — | |
| Joncryl | 98 | ng | — | — | |
| Joncryl | 74 | ng | — | — | |
| Joncryl | 97 | ng | — | — | |
| Joncryl | 618 | ng | — | — | |

*The highest rating for saturation dither was 16. Anything lower showed unacceptable loss in pixels.

Except for a fair "Hot Print" rating with Joncryl 87, which was found later to be from experimental conditions, the Joncryl 87, 89 and 134 non-film forming polymers were very good overall, in the foregoing Table, g=good; f=fair and ng=no good.

The polymers noted in the foregoing Table are more particularly described as follows:

| Commercial Name | Chemical | Manufacturer | % Solids | Tg (°C.) | Acid # |
|---|---|---|---|---|---|
| Joncryl 74 | Acrylic | Johnson | 48.5 | −16 | 50 |

-continued

| Commercial Name | Chemical | Manu-facturer | % Solids | Tg (°C.) | Acid # |
|---|---|---|---|---|---|
| Joncryl 77 | Acrylic | Johnson | 46 | 21 | 55 |
| Joncryl 52 | Acrylic | Johnson | 60 | 50 | 235 |
| Joncryl 56 | Acrylic | Johnson | 27 | 60 | 105 |
| Joncryl 58 | Acrylic | Johnson | 50 | 67 | 215 |
| Joncryl 61LV | Acrylic | Johnson | 35 | 67 | 215 |
| Joncryl 62 | Acrylic | Johnson | 30 | 70 | 190 |
| Joncryl 80 | Acrylic | Johnson | 48 | −30 | 60 |
| Joncryl 85 | Acrylic | Johnson | 30 | 10 | 125 |
| Joncryl 87 | Acrylic | Johnson | 48.5 | 100 | 40 |
| Joncryl 89 | Acrylic | Johnson | 48 | 98 | 50 |
| Joncryl 91 | Acrylic | Johnson | 25.5 | 10 | 125 |
| Joncryl 95 | Acrylic | Johnson | 30 | 43 | 65 |
| Joncryl 97 | Acrylic | Johnson | 37 | 45 | 37 |
| Joncryl 98 | Acrylic | Johnson | 47.5 | 1 | 35 |
| Joncryl 99 | Acrylic | Johnson | 36.5 | −7 | 95 |
| Joncryl 130 | Acrylic | Johnson | 37.5 | 62 | 150 |
| Joncryl 134 | Acrylic | Johnson | 44 | 95 | 35 |
| Joncryl 138 | Acrylic | Johnson | 43.5 | 55 | 60 |
| Joncryl 142 | Acrylic | Johnson | 39.5 | 10 | 125 |
| Joncryl 530 | Acrylic | Johnson | 49 | 75 | 50 |
| Joncryl 537 | Acrylic | Johnson | 46 | 44 | 43 |
| Joncryl 538 | Acrylic | Johnson | 45 | 64 | 53 |
| Joncryl 540 | Acrylic | Johnson | 45 | 20 | — |
| Joncryl 554 | Acrylic | Johnson | 46.5 | 37 | 54 |
| Joncryl 585 | Acrylic | Johnson | 43 | −20 | 30 |
| Joncryl 617 | Acrylic | Johnson | 45 | 7 | 50 |
| Joncryl 618 | Acrylic | Johnson | 29 | 98 | 70 |
| Joncryl 620 | Acrylic | Johnson | 47 | 20 | 45 |
| Joncryl 624 | Acrylic | Johnson | 49 | −30 | 50 |
| Joncryl 1535 | Acrylic | Johnson | 37 | 20 | 30 |
| Joncryl 1536 | Acrylic | Johnson | 39.5 | 20 | 30 |
| Joncryl 1679 | Acrylic | Johnson | 40 | 24 | 80 |
| Jonwax 22 | Wax | Johnson | 34 | — | — |
| Jonwax 26 | PE Wax | Johnson | 25 | — | — |
| Jonwax 120 | Wax | Johnson | 34 | — | — |
| Rhoplex HA-12 | Acrylic | Rohm & Haas | 45 | 17 | — |
| Polysize 500 | Acrylic | Morton | 30 | — | — |
| Polycryl 7F7 | Acrylic | Morton | 45 | — | — |
| Polyfilm 350 | Polyester | Morton | 30 | — | — |
| Polyfilm 342 | Acrylic | Morton | 25 | — | — |
| Polyfilm 301 | Acrylic | Morton | 25 | — | — |

EXAMPLE 3

A mix of the following components was prepared:

| Component | Amount (Gms.) | Function |
|---|---|---|
| 48.5% JONCRYL 87 | 426.8 | Dispersed polymer |
| 30% LUDOX HS-30 | 460.0 | 12 nm colloidal silica |
| Ethanol | 706.6 | Dispersing solvent |
| Water | 706.6 | Dispersing solvent |
| San-Sil KU-33 | 7.6 | Anti-block silica |

Figure 3:
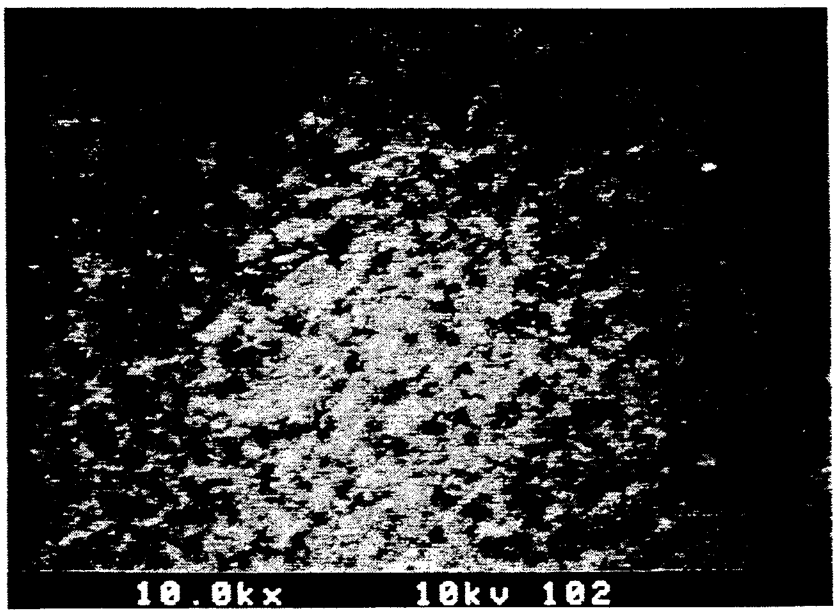
FIG. 3 is a photomicrograph of an acceptor sheet of the present invention, made in accordance with Example 3.

The mix was coated and processed as in Example 1. It was found that the coating could be dried at a hotter temperature than 80° C. and resulted in a better "HOT PRINT" than the Example 1 formulation with Joncryl 87 alone, but the bonding of the coating to the polyester film was not as good as in Example 1 without the colloidal silica. Saturation dither and the rag patch pattern remained excellent. A photomicrograph of the acceptor sheet at 10,000× magnification is shown in FIG. 3.

EXAMPLE 4

A mix of the following components was prepared:

| Component | Amount (Gms.) | Function |
|---|---|---|
| 48.5% JONCRYL 87 | 371.0 | Dispersed polymer |
| Water | 685.0 | Dispersing solvent |
| Ethanol | 616.0 | Dispersing solvent |
| 15% Nalco 2326 | 828.0 | 5 nm colloidal silica |
| San-Sil KU-33 | 8.0 | Anti-block silica |

Figure 4:
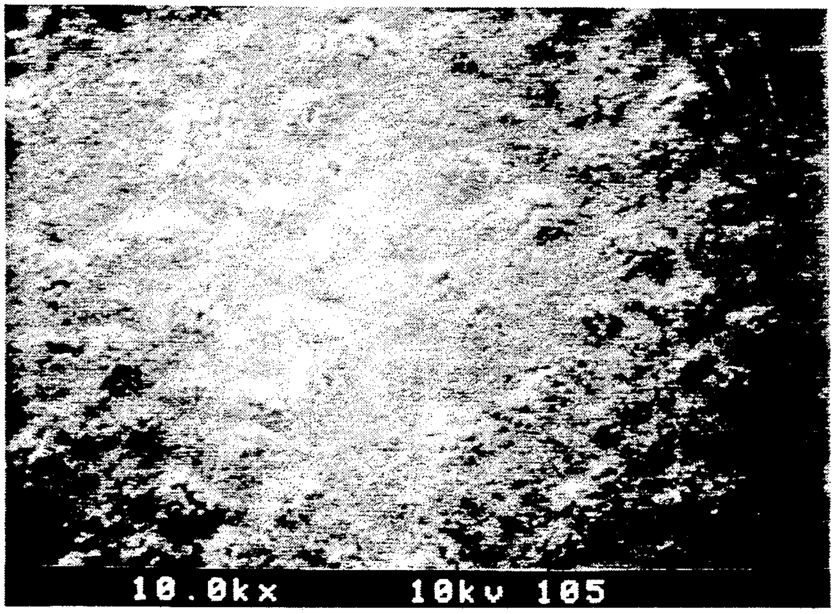
FIG. 4 is a photomicrograph of an acceptor sheet of the present invention, made in accordance with Example 4.

The mix was coated and processed as in Example 1. It was found that the coating could be dried at temperatures from 60° to 100° C. with excellent bonding, hot print, saturation dither, rag patch, and alignment pattern test prints. The coating was resistant to electrical charge build-up during the printing process as evidenced by an 18% Transmission Electrostatic Positive Toner wash as compared to the comparative formulation prepared in Example 1. A photomicrograph of the acceptor sheet surface at 10,000× magnification is shown in FIG. 4.

EXAMPLE 5

A mix of the following components was prepared:

| Component | Amount (Gms.) | Function |
|---|---|---|
| 48.5% JONCRYL 87 | 462.0 | Dispersed polymer |
| Water | 827.0 | Dispersing solvent |
| Ethanol | 827.0 | Dispersing solvent |
| 40% Nalco 2329 | 373.5 | 75 nm colloidal silica |
| San-Sil KU-33 | 10.0 | Anti-block silica |

The mix was coated and processed as in Example 1. Although the rag patch, alignment, and saturation dither test prints were good, the Hot Print was not as good as for the formulation in Example 4, and the matrix bond to the polyester base was poor enough to result in many print voids and image scratches. If the coating was dried over 80° C., the matrix bond improved, but the print quality began to deteriorate. The size of the colloidal silica approached the size of the polymer particles in this Example.

EXAMPLE 6

A mix of the following components was prepared:

| Component | Amount Gms. | Function |
|---|---|---|
| 48.5% JONCRYL 87 | 6.18 | Dispersed polymer |
| 23% M E 1000 CF | 4.00 | Dispersed polymer |
| Water | 19.91 | Dispersing solvent |
| Ethanol | 19.91 | Dispersing solvent |

(M E 1000 CF is an aqueous dispersion of polymethyl methacrylate beads about 400 nm. in size sold by Yorkshire Nachem, Rockland, Mass.)

The mix was coated and processed as in Example 1. It was found that the results were similar to those reported for the acceptor sheet prepared in Example 3.

EXAMPLE 7

The formulation of Example 4 was coated onto 400 gage ICI 583 (4.0 mils thick) polyester film using the technique described in Example 1, and dried. The dried film was then trimmed to an 8½"×11" sheet and imaged in a Minolta EP-5401 plain paper copier using a suitable master. An excellent image was obtained which could not be removed with either 3M 610 or 3M 810 adhesive tapes.

By comparison, a Nashua XF-10 xerographic (polyester) transparency film imaged in the same manner showed very poor toner adhesion with the 3M 610 or 810 tape. Also, uncoated ICI 583 imaged in the same manner exhibited toner image removal with the tapes.

Other non-film forming polymers, such as Rhoplex B-85 available from Rohm and Haas, also showed excellent results when employed in place of the Joncryl 87 of Example 1. The Rhoplex B-85 polymer has a $T_g$ of 106.8° C. and is present as an acrylic emulsion.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An acceptor sheet for receiving marking material in imagewise fashion by means of mass transfer printing, comprising a substrate having a coating with a microrough surface, wherein the coating comprises polymer particles which have not coalesced to form a uniform, continuous film.

2. The acceptor sheet of claim 1, wherein the non-coalesced polymer particles comprise styrenated acrylic polymer particles.

3. The acceptor sheet of claim 1, wherein the coating is comprised of a mixture of the non-coalesced polymer particles and a colloidal silica.

4. The acceptor sheet of claim 3, wherein the size of the colloidal silica is less than the average size of the polymer particle.

5. The acceptor sheet of claim 3, wherein the polymer particles are comprised of styrenated acrylic polymer particles.

6. The acceptor sheet of claim 1, wherein the sheet is transparent.

7. The acceptor sheet of claim 6, which further comprises a backing sheet.

8. The acceptor sheet of claim 1, which further comprises a backing sheet.

9. A donor sheet/acceptor sheet combination useful in mass transfer printing, wherein the acceptor sheet is the acceptor sheet of claim 1.

10. An acceptor sheet for receiving marking material in imagewise fashion by means of thermal mass transfer printing, comprising a substrate having a coating with a microrough surface, the coating comprising polymer particles which have not coalesced to form a uniform continuous film, and colloidal silica.

11. The acceptor sheet of claim 10, wherein the non-coalesced polymer particles are comprised of styrenated acrylic polymer particles.

12. The acceptor sheet of claim 10, wherein the substrate is a polymeric substrate.

13. The acceptor sheet of claim 12, wherein the polymeric substrate is comprised of a polyester film.

14. The acceptor sheet of claim 10, wherein the colloidal silica ranges in size from 4 to 75 nanometers.

15. The acceptor sheet of claim 14, wherein the size of the colloidal silica is less than the average size of the polymer particle.

16. The acceptor sheet of claim 10, wherein the sheet is transparent.

17. The acceptor sheet of claim 16, which further comprises a backing sheet.

18. The acceptor sheet of claim 10, which further comprises a backing sheet.

19. A donor sheet/acceptor sheet combination useful in thermal mass transfer printing, wherein the acceptor sheet is the acceptor sheet of claim 10.

* * * * *